(12) United States Patent
Saegesser et al.

(10) Patent No.: US 8,291,603 B2
(45) Date of Patent: Oct. 23, 2012

(54) HANDHELD POWER TOOL, IN PARTICULAR HANDHELD POWER SAW

(75) Inventors: Daniel Saegesser, Langenthal (CH); Sacha Felder, Langendorf (CH)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/836,483

(22) Filed: Jul. 14, 2010

(65) Prior Publication Data

US 2010/0275452 A1 Nov. 4, 2010

Related U.S. Application Data

(63) Continuation of application No. 12/090,203, filed as application No. PCT/EP2007/054445 on May 8, 2007, now Pat. No. 7,818,887.

(30) Foreign Application Priority Data

Jul. 7, 2006 (DE) .......................... 10 2006 031 513

(51) Int. Cl.
 *B23D 49/02* (2006.01)
(52) U.S. Cl. ........................................... 30/392; 30/393
(58) Field of Classification Search ................. 30/166.3, 30/392, 393, 394, 519; 173/216; 83/750, 83/762
 See application file for complete search history.

(56) References Cited

U.S. PATENT DOCUMENTS

| | | | |
|---|---|---|---|
| 2,337,769 A * | 12/1943 | Redenbo | 30/394 |
| 2,596,481 A * | 5/1952 | Hincks | 30/394 |
| 2,621,685 A * | 12/1952 | Butz | 30/394 |
| 2,764,188 A | 9/1956 | Hoffman | |
| 2,879,815 A * | 3/1959 | Papworth | 30/374 |
| 2,946,358 A * | 7/1960 | Bruck | 30/393 |
| 3,579,827 A * | 5/1971 | Grahn | 30/144 |
| 3,785,053 A * | 1/1974 | Michaelson | 30/394 |
| 3,945,120 A | 3/1976 | Ritz | |
| 4,385,443 A | 5/1983 | O'Banion | |
| 4,419,904 A | 12/1983 | Albury | |
| 5,398,417 A | 3/1995 | Quirijnen et al. | |
| 5,782,000 A | 7/1998 | Bednar | |
| 5,940,977 A | 8/1999 | Moores, Jr. | |
| 6,233,833 B1 | 5/2001 | Grant et al. | |
| 6,269,888 B1 * | 8/2001 | Schuda et al. | 173/48 |
| 6,772,662 B2 | 8/2004 | Marinkovich et al. | |
| 6,912,790 B2 | 7/2005 | James et al. | |
| 7,064,462 B2 | 6/2006 | Hempe et al. | |
| 7,093,668 B2 * | 8/2006 | Gass et al. | 173/2 |
| 7,096,590 B2 | 8/2006 | Marinkovich et al. | |
| 7,096,668 B2 | 8/2006 | Martling et al. | |

(Continued)

FOREIGN PATENT DOCUMENTS

CN 1429693 7/2003

(Continued)

*Primary Examiner* — Kenneth E. Peterson
*Assistant Examiner* — Jennifer Swinney
(74) *Attorney, Agent, or Firm* — Merchant & Gould P.C

(57) ABSTRACT

The invention relates to a handheld tool, in particular a handheld saw, with an electric drive motor (12), a serially switched gearbox (13), and a movement converter (14) that converts the driven movement of the gearbox (13) into an axial to-and-fro movement of a lifting element (15) for driving a tool (16), in particular a saw blade, inside a housing (11). The gearbox (13) and the movement converter (14) are combined into a gear unit (17). The gear unit (17) is within a robust, bending- and deformation-resistant gear housing (40), which is in turn inside the housing (11). The housing (11) is made of flexible plastic.

11 Claims, 4 Drawing Sheets

U.S. PATENT DOCUMENTS

| | | | |
|---|---|---|---|
| 7,107,691 B2 * | 9/2006 | Nottingham et al. | 30/392 |
| 7,204,026 B2 * | 4/2007 | Phillips et al. | 30/394 |
| 7,246,533 B2 | 7/2007 | Lagaly et al. | |
| 7,290,343 B2 * | 11/2007 | Hartmann | 30/394 |
| 7,506,447 B2 * | 3/2009 | Wheeler et al. | 30/392 |
| 7,770,553 B2 * | 8/2010 | Gorenflo et al. | 123/179.26 |
| 2003/0051352 A1 * | 3/2003 | Clark, Jr. | 30/392 |
| 2003/0121161 A1 * | 7/2003 | Swift | 30/392 |
| 2004/0068876 A1 | 4/2004 | Bigden et al. | |
| 2004/0163263 A1 * | 8/2004 | Wadge | 30/376 |
| 2004/0261273 A1 * | 12/2004 | Griep et al. | 30/392 |
| 2005/0178223 A1 | 8/2005 | Li et al. | |
| 2006/0005402 A1 | 1/2006 | Nottingham et al. | |
| 2007/0074405 A1 | 4/2007 | Nottingham et al. | |

FOREIGN PATENT DOCUMENTS

| | | | |
|---|---|---|---|
| CN | 2671742 | | 1/2005 |
| DE | 3828785 | A1 | 4/1896 |
| DE | 3543764 | A * | 6/1986 |
| DE | 3543776 | A1 * | 6/1986 |
| DE | 4140836 | A1 * | 6/1993 |
| DE | 29613157 | U1 * | 11/1997 |
| EP | 124198 | A1 * | 11/1984 |
| EP | 1238761 | A1 * | 9/2002 |
| EP | 1 325 790 | | 7/2003 |
| GB | 2 234 034 | | 1/1991 |
| GB | 2234033 | A * | 1/1991 |
| RU | 2 015 873 | | 7/1994 |
| RU | 2003 116 149 | | 1/2005 |
| SU | 655030 | | 3/1979 |

\* cited by examiner

HANDHELD POWER TOOL, IN PARTICULAR HANDHELD POWER SAW

This application is a Continuation of U.S. Ser. No. 12/090,203, filed 14 Apr. 2008, now U.S. Pat. No. 7,818,887 issued Oct. 26, 2010, which is a National Stage Application of PCT/EP2007/054445, filed 8 May 2007, which claims benefit of Serial No. 10 2006 031 513.8, filed 7 Jul. 2006 in Germany and which applications are incorporated herein by reference. To the extent appropriate, a claim of priority is made to each of the above disclosed applications.

PRIOR ART

The invention is based on a handheld power tool, in particular a handheld power saw, as generically defined by the preamble to claim 1.

A handheld power tool that can be bent longitudinally is known that has an angular gear and a motion converter that converts the power takeoff rotary motion of the drive motor into an axially reciprocating working motion of the saw blade, and these parts are combined into a gear unit, forming a compact device. This handheld power tool can be supplied with power via cords, from the utility grid. It is still quite bulky, however.

DISCLOSURE OF THE INVENTION

The handheld power tool of the invention, in particular the handheld power saw, having the characteristics of claim 1 has the advantage that it is designed to be small, handy, and above all both robust and lightweight. The flexible plastic housing is capable of absorbing forces if the handheld power tool hits something or falls, without the risk of damage or destruction.

By the provisions in the other claims, advantageous refinements of and improvements to the handheld power tool recited in claim 1 are possible.

BRIEF DESCRIPTION OF THE DRAWINGS

The invention is described in further detail in the ensuing description in terms of exemplary embodiments shown in the drawings. Shown are.

EMBODIMENTS OF THE INVENTION

Figure 1:
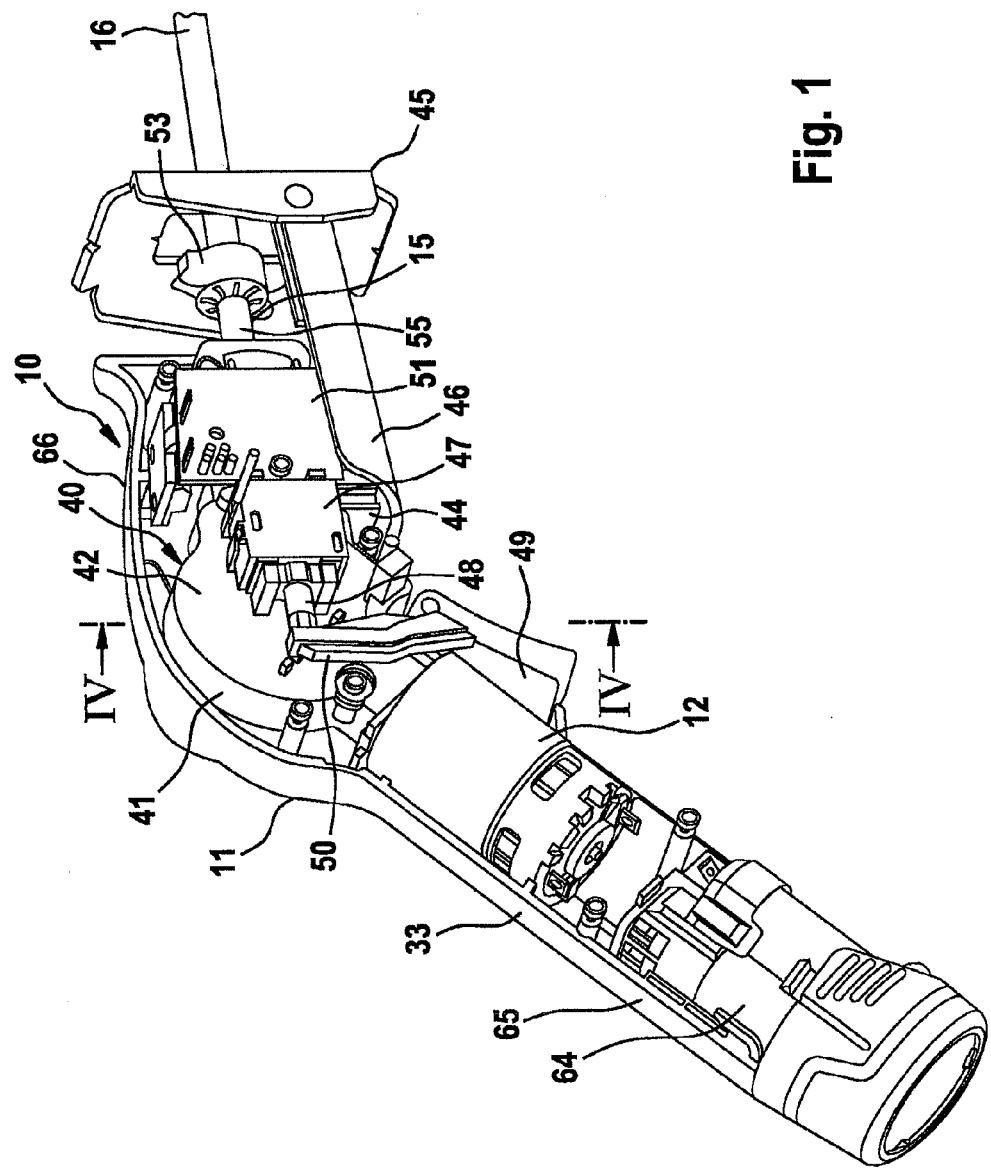
FIG. 1, a schematic perspective view of a handheld power tool, embodied as a handheld power saw, with a housing shell removed.

In FIG. 1, an electric handheld power tool 10 is shown, which is designed as a small, handy, robust handheld power saw designed approximately like a straight-back hand saw with an open handle. This handheld power tool 10, inside a housing 11, has an electric drive motor 12, a gear 13 downstream of the drive motor 12, and a motion converter 14. By means of the motion converter 14, the power takeoff rotary motion of the gear 13 is converted into an axially reciprocating working motion of a reciprocating element 15 for driving a tool 16, especially a saw blade. The gear 13 and the motion converter 14 form a drive train and are combined into a gear unit 17.

The gear 13 is embodied as an angular gear. It has a power takeoff pinion 18, which is press-fitted onto the motor shaft 19, and a crown gear wheel 20, with which the power takeoff pinion 18 is operationally in engagement. By means of this gear 13, the power takeoff rpm of the drive motor 12 is stepped down to a lesser rpm of the crown gear wheel 20. The crown gear wheel 20 has a press-fitted-in bearing bolt 21, which protrudes to one side of the crown gear wheel 20 and is supported by means of at least one deep-groove bearing, and preferably by means of two axially adjacent deep-groove bearings 22, 23. In this way, the crown gear wheel 20 is floatingly supported. On the side diametrically opposite the deep-groove bearings 22, 23, the crown gear wheel 20 has an eccentrically located, press-fitted-in bolt 24, which engages a sleeve 25 on an end toward it of a connecting rod 26 of the motion converter 14. Via the bolt 24, the power takeoff rotary motion of the crown gear wheel 20 is converted, by means of the connecting rod 26, into a linear, reciprocating motion with a suitable stroke length. The connecting rod 26 is formed of two longitudinal struts 27, 28, parallel to one another and extending at a spacing from one another, which are connected in one piece to one another on both ends via eyelets 29, 30 located there. The sleeve 25 is received in the eyelet 29. In the region near the crown gear wheel 20, the connecting rod 26 is overlapped on both sides by pins 31, 32 oriented transversely, and in particular approximately perpendicularly, to it, which serve to guide the connecting rod 26 on both sides in the transverse direction.

Figure 3:
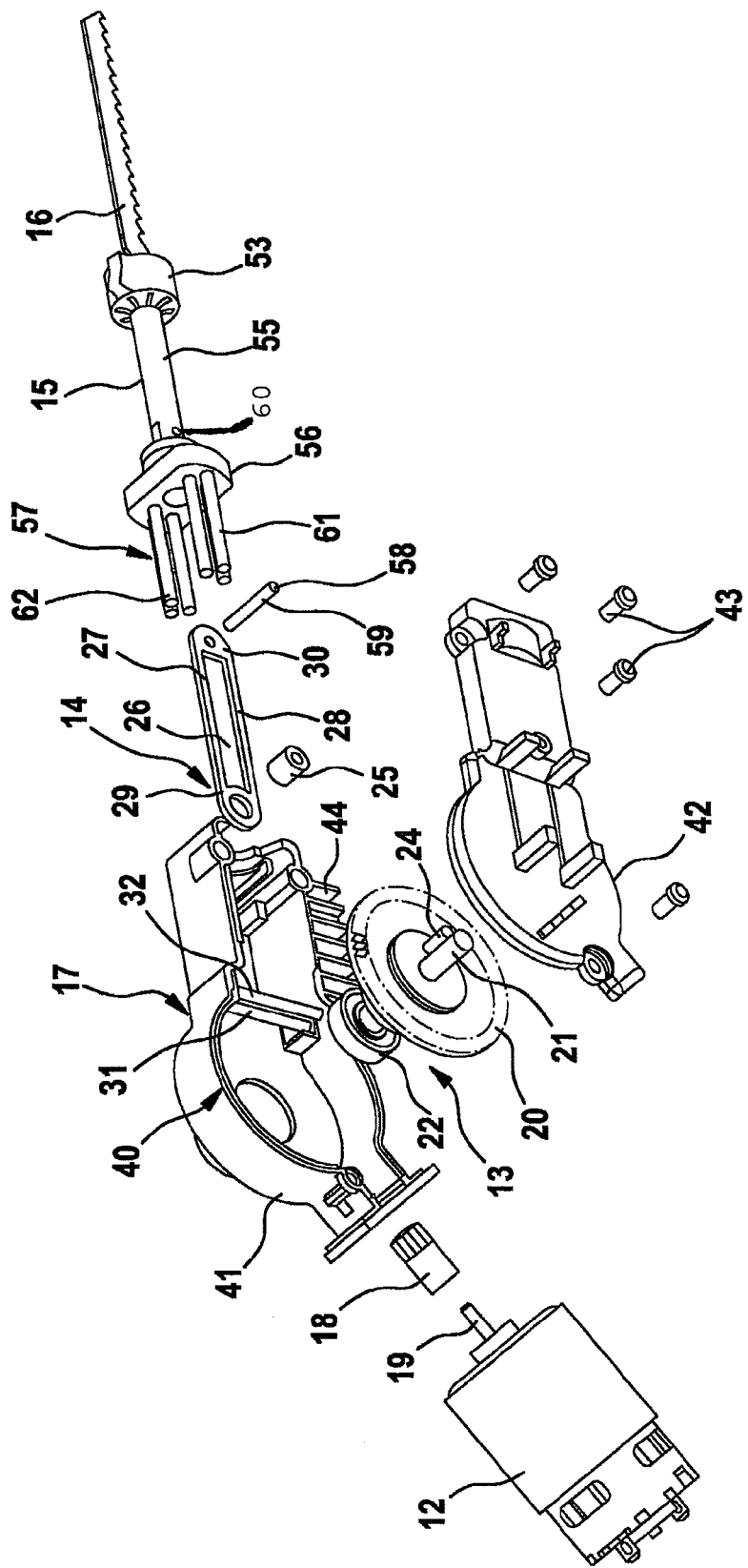
FIG. 3, a schematic perspective exploded view of the elements shown in FIG. 2 of the handheld power tool.

As can be seen in FIG. 3, the connecting rod 26 has first and second opposite sides.

The gear unit 17 formed of the above-described gear 13 and motion converter 14 by combining them is located inside a robust gearbox 40 that is resistant to bending and torsion. This gearbox 40 is in turn received in the housing 11. The gearbox 40 is formed in particular of metal, such as aluminum, and is in two parts. It comprises one molded body in the form of a housing shell 41 and a housing cap 42 that covers the housing shell 41 and that is detachably connected to the housing shell 41 via fastening means 43, such as screws. The housing 11 is formed of two housing shells 33, 34, which are detachably connected to one another inside a mold parting plane 35 that is symmetrical to the housing 11. This housing 11 advantageously comprises a flexible material. This design with regard to material is possible because of the compact structure and because of the fact that the gear unit 17 is received in the robust gearbox 40 that is resistant to bending and torsion. The thus-designed flexible plastic housing 11 is capable of absorbing forces, for instance if the handheld power tool 10 falls. The handheld power tool 10 is in this way protected to a high degree against damage on falling, even if it falls from a great height.

Figure 4:
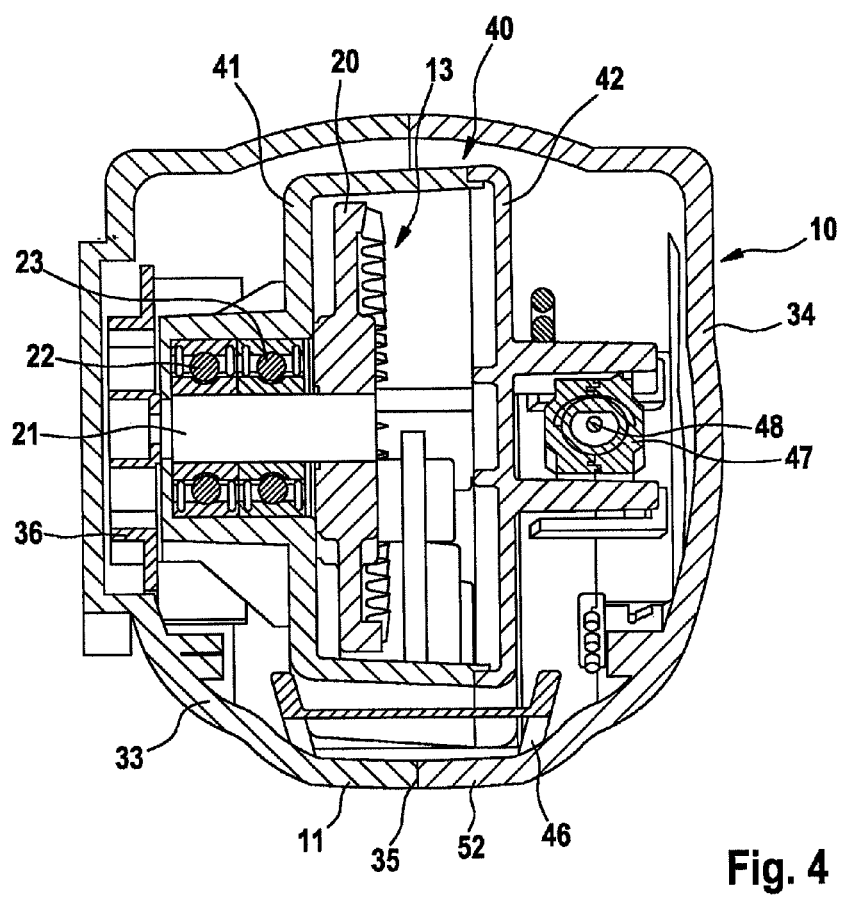
FIG. 4, a schematic section through the handheld power tool in the direction of the arrows IV-IV in FIG. 1, on a larger scale.

A ribbed body 44, which is embodied as a heat sink and as a bending- and torsion-resistant mount that is for an end plate 45 and which is in one piece with the gearbox 40, is located on the gearbox 40, in particular on the housing shell 41, in the region below the motion converter 14. The end plate 45 is seated on a holder 46, which is secured to the ribbed body 44. An electric switch 47, indicated only schematically, is located laterally beside and approximately parallel to the gear unit 17, and its actuation member 48 is coupled to an actuator 49, such as a toggle, via a lever 50. An electronic monitoring device 51, also indicated only schematically, is likewise located laterally beside the gear unit 17, for instance approximately parallel to it, and is intended to monitor the current consumption. Both the electric switch 47 and the electronic monitoring device 51 are seated on the outside of the housing cap 42 that faces away from the housing shell 41. This arrangement again makes a small, compact structure of the handheld power tool 10 possible. The location of the switch 47 and monitoring device 51 offset transversely with respect to the approximately symmetrically extending mold parting plane 35 means that the actuator 49, such as a toggle, is transversely offset relative to this mold parting plane 35 of both housing shells 33, 34, as can also be seen from the position of the through opening 52, indicated in FIG. 4, for the actuator 49. Particularly from FIG. 4, the floating support of the crown gear wheel 20 by means of the two deep-groove bearings 22, 23 that are received in the housing shell 41 also becomes clear. The gear 13 has a fan wheel 36, driven by it, which is located on the bearing bolt 21 of the crown gear wheel 20. By means of the fan wheel 36, which is provided on the drive motor 12 in addition to the motor fan, heat dissipation from the gear 13 and cooling, for instance of the electronic monitoring device 51, are possible in a simple way. For removing heated air, conduits provided in the usual way in the housing 11 and openings provided on the side of the housing toward the end plate 45 are used, by way of which the waste air is carried away; the waste air simultaneously serves as blowing air for removing particles, such as sawdust or chips, at the place being machined by the handheld power tool 10.

On the end facing away from the gearbox 40, the reciprocating element 15 has a clamping system 53, shown only schematically, for interchangeably mounting a tool 16, such as a saw blade. The clamping system 53 is designed in the usual way and makes it possible to fasten a tool 16 both in one position and in another position rotated 180° relative to it. This increases the accessibility to places that are hard to reach in working with the handheld power tool 10, and thus the handheld power tool can be used even at poorly accessible places.

Figure 2:
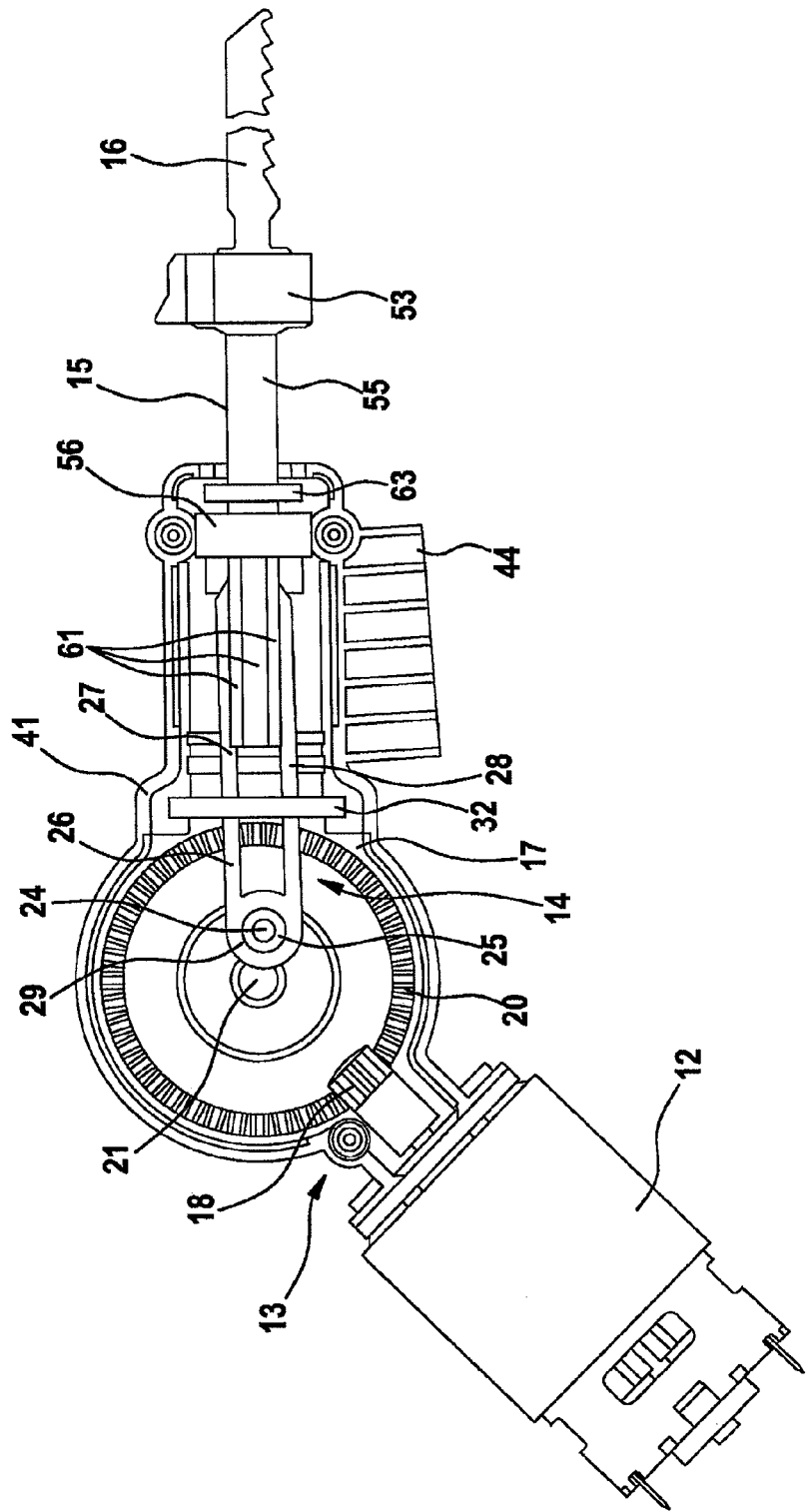
FIG. 2, a schematic side view of individual elements of the handheld power tool, together with a portion of its gearbox.

The reciprocating element 15 that can be driven to reciprocate by the motion converter 14 is embodied as a rod 55 that protrudes out of the gearbox 40. A slide bearing 56 is located in the gearbox 40, and in this slide bearing the reciprocating element 15, in particular in the form of the rod 55, is supported and guided displaceably back and forth. The slide bearing 56 is received nonrotatably between the housing shell 41 and the housing cap 42 and is penetrated by the end toward it of the reciprocating element 15, in particular the rod 55. The location is moreover selected such that guide means for guiding the reciprocating element 15 are provided that are operative between the slide bearing 56 and the reciprocating element 15, in particular the rod 55. These guide means may be formed of a nonround and/or angular cross-sectional shape of the reciprocating element 15 and of the bore, penetrated by it, of the slide bearing 56. In this way, torques introduced into the reciprocating element 15 as well are absorbed by the slide bearing 56. In the exemplary embodiment shown, the guide means between the slide bearing 56 and the reciprocating element 15 are formed of longitudinal guides 57, located on the slide bearing 56, which protrude from the slide bearing 56, and at least one connecting element 58, engaging the reciprocating element 15 in the region of the eyelet 30, by means of which connecting element the motion converter 14 is connected on the power takeoff side to the reciprocating element 15; by means of the longitudinal guides 57, this connecting element 58 is supported and guided in the longitudinal and/or transverse direction. The at least one connecting element 58 for instance simply comprises a cross pin 59, which engages both the end of the connecting rod 26 remote from the gear 13 and the end of the reciprocating element 15 toward the connecting rod 26, and for instance transversely penetrates bores 60 provided in a fork, located on the end of the reciprocating element 15, that receives the eyelet 30. The longitudinal guides 57 protrude from the slide bearing 56 in the direction toward the connecting rod 26 that extends between them. The longitudinal guides 57 of the slide bearing 56 have guide pins 61 on one side and 62 on the other side of the connecting rod 26, which are approximately parallel to one another, and of which, three guide pins may for instance be provided on each side. The connecting element 58, in particular the cross pin 59, with respective end portions, protrudes on both sides out of the bores 60 of the reciprocating element 15 and is received with these two end portions on both sides between two guide pins 61 on one side and 62 on the other; these two guide pins 61 and 62 extend in planes, approximately parallel to one another, that extend approximately parallel to the plane that contains the connecting rod 26. These two guide pins 61 and 62 on both sides act similarly to respective longitudinal guide grooves for the respective end portion, located between them, of the connecting element 58. The third guide pin 61 and 62 provided for each side, respectively, extends farther outward spaced apart from the respective aforementioned plane within which the respective pairs 61 and 62 of guide pins extend. This transverse spacing is approximately equivalent to the length of the connecting element 58. It is thus attained that the connecting element 58 rests, with the respective approximately frontal end on the respective guide pin 61 and 62 and is supported and guided not only in the longitudinal direction but also in particular in the transverse direction as well. This design of the guide means is especially simple and economical. As can be seen from FIG. 2, on the side of the slide bearing 56 that faces toward the clamping system 53, pins 63 analogous to the pins 31, 32 may be provided, between which the reciprocating rod 55 is additionally guided. The support as described for the reciprocating element 15 including its guidance is simple and economical and makes fast, easy assembly possible.

As depicted in FIG. 3, the reciprocating rod 55 projects outwardly from the gear box 40 at an obtuse angle to the motor shaft 19.

The handheld power tool 10 is supplied with power by at least one battery, preferably at least one rechargeable battery, which is shown only schematically and identified by reference numeral 64. This at least one rechargeable battery 64 is a lithium-ion (Li-ion) cell for supplying the drive motor 12.

The housing 11 has a first portion 65, acting as a handle part, and a second portion 66, adjoining the first portion 65 in one piece and inclined at an obtuse angle to it. The at least one rechargeable battery 64 and the electric drive motor 12 are both received in the first portion 65, while the gearbox 40 with the gear unit 17 it contains are contained in the second portion 66.

The handheld power tool 10 is small, lightweight, handy, and robust, and because of the power supply by means of at least one battery, in particular a rechargeable battery 64, it is especially simple and easy to manipulate. Moreover, the handheld power tool 10 is highly safe in operation and is also secure against damage from any impacts or from falling.

The invention claimed is:

1. A handheld power tool comprising:
    (a) a housing formed of flexible plastic having a first portion, serving as a handle part, and a second portion adjoining the first portion in one molded plastic piece and at fixed obtuse angle;
    (b) an electric drive motor being received in the housing;
    (c) a metal gearbox resistant to bending and torsion, the metal gearbox having two parts comprising a housing shell and a housing cap that covers the housing shell and that is detachably connected to the housing shell, the metal gearbox being received in the second portion of the housing;

(d) a gear connected to the electric drive motor;

(e) a motion converter constructed and configured to convert power takeoff rotary motion of the gear into an axially reciprocating working motion of a reciprocating element for driving a tool, the reciprocating element comprising a rod protruding from the metal gearbox, with a clamping system located on one end for interchangeably mounting a tool;

(f) a gear unit that combines the gear and the motion convertor, the gear unit being received in the metal gearbox;

(g) a slide bearing, in which the reciprocating element is supported and guided displaceably back and forth, the slide bearing being received in the gearbox; and (h) at least one rechargeable battery for supplying the drive motor, the battery being at least partially received in the housing;

(i) wherein the reciprocating element of the motion converter is guided by parallel pins positioned adjacent to opposite flat sides of the reciprocating element that limit relative motion between the gear wheel and the motion converter in a direction transverse to that of the linear reciprocation direction of the tool.

2. A handheld power tool according to claim 1, wherein reciprocating element and rod are formed separately to each other by a pin.

3. A handheld power tool according to claim 1, wherein the tool is a saw blade.

4. A handheld power tool according to claim 1 including:
(a) an end plate; and
(b) wherein the clamping system is positioned between the end plate and the gear box.

5. A handheld power tool according to claim 1 including:
(a) an electric switch and electric monitoring device.

6. A handheld power tool comprising:
(a) a plastic housing having a handle part and another portion adjoining the handle part;
(b) a rechargeable battery positioned within the handle part;
(c) a linearly reciprocating tool;
(d) an electric drive motor positioned in the housing and having a rotatable motor shaft that rotates around an axis that extends non-parallel, non-colinear and non-perpendicular to the linear reciprocating tool;
(e) a rotating gear positioned on the motor shaft;
(f) a motion converter configured to convert rotary motion of the gear to axially linearly reciprocating motion of the tool, the motion converter comprising a connecting rod having first and second opposite flat sides; and
(g) a metal gear box secured to, and positioned within, the housing;
  (i) the motion converter being positioned in the gear box;
  (ii) the gear box including at least one gear wheel therein having an eccentrically located projection;
  (iii) a sleeve which engages an opening of the connecting rod and the eccentrically located projection, the sleeve having a circular cross-section;
  (iv) the motor shaft projecting into the gear box from the motor;
  (v) a reciprocating rod projecting outwardly from the gear box at an obtuse angle to the motor shaft, the reciprocating rod having a circular cross-section and being connected to the connecting rod;
  (vi) a slide bearing:
    (A) surrounding the reciprocating rod; and
    (B) positioned in the gear box;
  (vii) wherein the connecting rod of the motion converter is guided by parallel pins positioned adjacent to the opposite flat sides of the connecting rod that limit relative motion between the gear wheel and the motion converter in a direction transverse to that of the linear reciprocation direction of the tool.

7. A handheld power tool according to claim 6, wherein reciprocating rod and the connecting rod are formed separately and connected to each other by a pin.

8. A handheld power tool according to claim 6, wherein the tool is a saw blade.

9. A handheld power tool according to claim 6 including:
(a) an end plate; and
(b) a clamping system releaseably fastening the tool; the clamping system being positioned between the end plate and the gear box.

10. A handheld power tool according to claim 6 including:
(a) an electric switch and electric monitoring device.

11. A handheld power tool according to claim 6, wherein the plastic housing is a single molded plastic piece having a fixed obtuse angle between the handle part and the portion adjoining the handle part.

* * * * *